(12) United States Patent
Probasco et al.

(10) Patent No.: US 12,552,559 B2
(45) Date of Patent: Feb. 17, 2026

(54) ANTENNA MEASUREMENT USING UNMANNED AERIAL VEHICLES

(71) Applicant: T-Mobile USA, Inc., Bellevue, WA (US)

(72) Inventors: Michael Scott Probasco, Frisco, TX (US); George Frantz Cummings, Gilbert, AZ (US); Brett Christian, Independence, MO (US)

(73) Assignee: T-Mobile USA, Inc., Bellevue, WA (US)

( * ) Notice: Subject to any disclaimer, the term of this patent is extended or adjusted under 35 U.S.C. 154(b) by 118 days.

(21) Appl. No.: 17/949,994

(22) Filed: Sep. 21, 2022

(65) Prior Publication Data

US 2024/0094744 A1    Mar. 21, 2024

(51) Int. Cl.
| | |
|---|---|
| *B64U 10/13* | (2023.01) |
| *B64U 101/00* | (2023.01) |
| *G01R 29/08* | (2006.01) |
| *G05D 1/00* | (2024.01) |

(52) U.S. Cl.
CPC ......... *B64U 10/13* (2023.01); *G01R 29/0892* (2013.01); *G05D 1/104* (2013.01); *B64U 2101/00* (2023.01); *B64U 2201/102* (2023.01)

(58) Field of Classification Search
CPC .. G05D 1/104; B64C 39/024; G01R 29/0892; B64U 2201/102; B64U 2101/00
See application file for complete search history.

(56) References Cited

U.S. PATENT DOCUMENTS

| | | |
|---|---|---|
| 8,178,825 B2 | 5/2012 | Goossen et al. |
| 8,378,881 B2 | 2/2013 | Lemire et al. |
| 9,049,740 B1 | 6/2015 | Tillotson et al. |
| 9,102,406 B2 | 8/2015 | Stark et al. |
| 9,415,870 B1 | 8/2016 | Beckman et al. |
| 9,454,907 B2 | 9/2016 | Hafeez et al. |
| 9,501,060 B1 | 11/2016 | Zhang et al. |
| 9,567,081 B1 | 2/2017 | Beckman et al. |
| 9,571,180 B2 | 2/2017 | Jalali et al. |
| 9,589,476 B2 | 3/2017 | Zhang et al. |
| 9,590,720 B2 | 3/2017 | Jalali |

(Continued)

FOREIGN PATENT DOCUMENTS

| | | |
|---|---|---|
| CN | 204906394 U | 12/2015 |
| CN | 205750548 U | 11/2016 |

(Continued)

*Primary Examiner* — Anne Marie Antonucci
*Assistant Examiner* — Jared C Bean
(74) *Attorney, Agent, or Firm* — Perkins Coie LLP (57) ABSTRACT

A system for testing a radio transmitter includes multiple unmanned aerial vehicles (UAVs). The multiple UAVs are deployed in the environment surrounding the radio transmitter, enabling simultaneous measurement of the signal emitted by the radio transmitter at multiple points in a variety of configurations. In some implementations, one of the UAVs can be configured as a control unit that facilitates communication between the radio transmitter and the remaining UAVs. In this manner, measurements can be transmitted from the UAVs to the transmitter in real-time. These measurements can then be used as feedback to quickly adjust the radio transmission or reception or to update the flight pattern of the UAVs.

14 Claims, 5 Drawing Sheets

(56) References Cited

U.S. PATENT DOCUMENTS

| | | | |
|---|---|---|---|
| 9,596,617 B2 | 3/2017 | Priest et al. | |
| 9,660,718 B2 | 5/2017 | Jalali et al. | |
| 9,668,146 B2* | 5/2017 | Lau | G05D 1/0274 |
| 9,689,976 B2 | 6/2017 | Parker et al. | |
| 9,712,228 B2 | 7/2017 | Jalali et al. | |
| 9,715,009 B1 | 7/2017 | Parker et al. | |
| 9,776,200 B2 | 10/2017 | Busby et al. | |
| 9,798,329 B2 | 10/2017 | Shattil | |
| 9,802,701 B1 | 10/2017 | Hawes et al. | |
| 9,818,303 B2 | 11/2017 | Kotecha | |
| 9,834,306 B2 | 12/2017 | Almasoud | |
| 9,866,313 B1 | 1/2018 | Murphy | |
| 9,875,660 B2 | 1/2018 | Byers et al. | |
| 9,891,631 B1 | 2/2018 | Hanlon | |
| 9,928,750 B2 | 3/2018 | Priest | |
| 9,944,404 B1 | 4/2018 | Gentry | |
| 9,959,772 B2 | 5/2018 | Priest | |
| 9,977,963 B1 | 5/2018 | Fendell | |
| 10,015,762 B2 | 7/2018 | Gan | |
| 10,037,463 B2 | 7/2018 | Schultz et al. | |
| 10,039,114 B2 | 7/2018 | Tan | |
| 10,133,271 B2 | 11/2018 | Hutson | |
| 10,137,983 B2 | 11/2018 | Horn | |
| 10,153,830 B2 | 12/2018 | Kosseifi et al. | |
| 10,189,566 B2 | 1/2019 | Terry et al. | |
| 10,198,956 B2 | 2/2019 | Silverman | |
| 10,371,794 B2 | 8/2019 | Kim et al. | |
| 10,372,122 B2 | 8/2019 | Zach | |
| 10,389,432 B2 | 8/2019 | De Rosa et al. | |
| 10,416,668 B2 | 9/2019 | Hammond et al. | |
| 10,431,103 B2 | 10/2019 | Murphy | |
| 10,507,917 B2 | 12/2019 | Taylor et al. | |
| 10,586,464 B2 | 3/2020 | Dupray et al. | |
| 10,613,209 B2 | 4/2020 | Emami et al. | |
| 10,633,115 B2 | 4/2020 | Pilskalns | |
| 10,665,117 B2 | 5/2020 | Just | |
| 10,679,510 B2 | 6/2020 | Gong et al. | |
| 10,690,781 B2 | 6/2020 | Kosseifi et al. | |
| 10,710,710 B2 | 7/2020 | Price | |
| 10,730,620 B1 | 8/2020 | Hanlon | |
| 10,815,005 B1 | 10/2020 | Wilcox et al. | |
| 10,937,326 B1 | 3/2021 | Stein et al. | |
| 10,952,113 B2 | 3/2021 | Mahkonen et al. | |
| 10,993,120 B1* | 4/2021 | Lekutai | H04B 17/29 |
| 11,014,667 B2 | 5/2021 | Lery et al. | |
| 11,022,407 B2 | 6/2021 | Whitmarsh et al. | |
| 11,050,481 B2 | 6/2021 | Crans et al. | |
| 11,104,435 B2 | 8/2021 | Zhang et al. | |
| 11,166,208 B2 | 11/2021 | Takács et al. | |
| 11,174,021 B2 | 11/2021 | Anderson et al. | |
| 11,212,728 B2 | 12/2021 | Murphy | |
| 11,231,726 B2 | 1/2022 | Liu et al. | |
| 11,237,559 B2 | 2/2022 | Christian et al. | |
| 11,242,143 B2 | 2/2022 | Michini et al. | |
| 11,250,709 B2 | 2/2022 | Priest | |
| 11,283,529 B2 | 3/2022 | De Rosa et al. | |
| 11,294,397 B2 | 4/2022 | Johnson et al. | |
| 11,341,860 B2 | 5/2022 | Priest | |
| 11,345,473 B1 | 5/2022 | Liberko et al. | |
| 2006/0229026 A1* | 10/2006 | Lynch | H04B 17/0085 455/69 |
| 2016/0269913 A1* | 9/2016 | Paulraj | H04W 16/18 |
| 2016/0269932 A1* | 9/2016 | Nemavat | H04W 28/0231 |
| 2016/0330771 A1* | 11/2016 | Tan | H04B 7/18506 |
| 2016/0363929 A1 | 12/2016 | Clark et al. | |
| 2016/0376031 A1* | 12/2016 | Michalski | G08G 5/52 701/15 |
| 2017/0013478 A1* | 1/2017 | Singh | H04B 7/18506 |
| 2017/0046873 A1* | 2/2017 | Terry | H04N 13/275 |
| 2017/0048925 A1* | 2/2017 | Song | H04W 40/12 |
| 2017/0123413 A1 | 5/2017 | Ye et al. | |
| 2017/0155456 A1 | 6/2017 | Wennerlöf et al. | |
| 2017/0199269 A1* | 7/2017 | Allen | G01S 5/12 |
| 2017/0233071 A1 | 8/2017 | Pilskalns et al. | |
| 2017/0297712 A1 | 10/2017 | Kim et al. | |
| 2018/0059660 A1 | 3/2018 | Heatzig et al. | |
| 2018/0115065 A1 | 4/2018 | Valdes Garcia et al. | |
| 2018/0194466 A1 | 7/2018 | Zhao et al. | |
| 2018/0234320 A1* | 8/2018 | Paulraj | H04W 28/0268 |
| 2019/0035285 A1 | 1/2019 | Priest | |
| 2019/0041225 A1* | 2/2019 | Winkle | H04W 48/16 |
| 2019/0043368 A1 | 2/2019 | Priest | |
| 2019/0122455 A1 | 4/2019 | Howard et al. | |
| 2019/0156687 A1 | 5/2019 | Silverman | |
| 2019/0327712 A1 | 10/2019 | Moradi et al. | |
| 2019/0339081 A1 | 11/2019 | Malhotra | |
| 2020/0039373 A1 | 2/2020 | Cantrell et al. | |
| 2020/0159209 A1 | 5/2020 | Montoya-Mejia | |
| 2020/0183426 A1* | 6/2020 | Wen | G01R 29/10 |
| 2020/0189731 A1 | 6/2020 | Mistry et al. | |
| 2020/0200850 A1 | 6/2020 | Piazza et al. | |
| 2020/0225684 A1 | 7/2020 | Anderson et al. | |
| 2020/0252143 A1* | 8/2020 | Liu | H04B 17/318 |
| 2020/0252838 A1* | 8/2020 | Akdeniz | H04W 36/0061 |
| 2020/0294401 A1* | 9/2020 | Kerecsen | G08G 1/205 |
| 2020/0301423 A1 | 9/2020 | Wang et al. | |
| 2020/0312163 A1 | 10/2020 | Dürr | |
| 2020/0385115 A1 | 12/2020 | Piasecki et al. | |
| 2021/0029664 A1* | 1/2021 | Lu | H04W 4/023 |
| 2021/0048829 A1* | 2/2021 | Deyle | G05D 1/0274 |
| 2021/0074167 A1 | 3/2021 | Hong | |
| 2021/0160749 A1* | 5/2021 | Lu | H04W 36/00835 |
| 2021/0200245 A1* | 7/2021 | Lim | G08G 5/32 |
| 2021/0253245 A1 | 8/2021 | Hong | |
| 2021/0255158 A1 | 8/2021 | Smith et al. | |
| 2021/0343154 A1 | 11/2021 | Faccin et al. | |
| 2021/0349458 A1 | 11/2021 | Pu et al. | |
| 2021/0373552 A1 | 12/2021 | Bhuyan et al. | |
| 2021/0373580 A1 | 12/2021 | Morales Delgado | |
| 2022/0036741 A1 | 2/2022 | Ozturk et al. | |
| 2022/0046528 A1 | 2/2022 | Yang et al. | |
| 2022/0080237 A1 | 3/2022 | Predonu et al. | |
| 2022/0189320 A1 | 6/2022 | Melodia et al. | |
| 2022/0212813 A1 | 7/2022 | Zhang | |
| 2023/0058405 A1* | 2/2023 | Chen | G08G 5/30 |

FOREIGN PATENT DOCUMENTS

| | | |
|---|---|---|
| CN | 107402396 A | 11/2017 |
| CN | 208013786 U | 10/2018 |
| CN | 109975621 A | 7/2019 |
| CN | 110176955 A | 8/2019 |
| CN | 106200680 B | 3/2020 |
| CN | 109131938 B | 3/2020 |
| CN | 111025298 A | 4/2020 |
| CN | 111198004 A | 5/2020 |
| CN | 107179778 B | 6/2020 |
| CN | 111273694 A | 6/2020 |
| CN | 210776321 U | 6/2020 |
| CN | 210882677 U | 6/2020 |
| CN | 106155075 B | 7/2020 |
| CN | 110425935 B | 7/2020 |
| CN | 111473784 A | 7/2020 |
| CN | 110635831 B | 8/2020 |
| CN | 111537807 A | 8/2020 |
| CN | 111624414 A | 9/2020 |
| CN | 111694371 A | 9/2020 |
| CN | 111717389 A | 9/2020 |
| CN | 211554748 U | 9/2020 |
| CN | 109613931 B | 10/2020 |
| CN | 111829747 A | 10/2020 |
| CN | 111880551 A | 11/2020 |
| CN | 111948465 A | 11/2020 |
| CN | 111968412 A | 11/2020 |
| CN | 112000130 A | 11/2020 |
| CN | 107544541 B | 12/2020 |
| CN | 112015202 A | 12/2020 |
| CN | 110650432 B | 1/2021 |
| CN | 111739349 B | 1/2021 |
| CN | 112180975 A | 1/2021 |
| CN | 112180985 A | 1/2021 |
| CN | 112213567 A | 1/2021 |
| CN | 112217580 A | 1/2021 |
| CN | 108089205 B | 2/2021 |

(56) References Cited

FOREIGN PATENT DOCUMENTS

| | | |
|---|---|---|
| CN | 112312327 A | 2/2021 |
| CN | 107728642 B | 3/2021 |
| CN | 110635830 B | 3/2021 |
| CN | 112435454 A | 3/2021 |
| CN | 112486195 A | 3/2021 |
| CN | 112583517 A | 3/2021 |
| CN | 212871208 U | 4/2021 |
| CN | 107688354 B | 6/2021 |
| CN | 109346845 B | 6/2021 |
| CN | 110649939 B | 6/2021 |
| CN | 110942673 B | 6/2021 |
| CN | 112902928 A | 6/2021 |
| CN | 112945015 A | 6/2021 |
| CN | 110601775 B | 7/2021 |
| CN | 110937138 B | 7/2021 |
| CN | 111002846 B | 7/2021 |
| CN | 111446990 B | 7/2021 |
| CN | 113110541 A | 7/2021 |
| CN | 113190032 A | 7/2021 |
| CN | 113593307 A | 11/2021 |
| CN | 113641186 A | 11/2021 |
| CN | 113671972 A | 11/2021 |
| CN | 107922049 B | 12/2021 |
| CN | 108615346 B | 12/2021 |
| CN | 109358636 B | 12/2021 |
| CN | 113872725 A | 12/2021 |
| CN | 111629329 B | 2/2022 |
| CN | 113055078 B | 2/2022 |
| CN | 110907741 B | 4/2022 |
| CN | 111884740 B | 4/2022 |
| CN | 114697248 A | 7/2022 |
| DE | 102018102112 A1 | 8/2019 |
| DE | 102018103298 A1 | 8/2019 |
| DE | 102019217763 A1 | 5/2020 |
| DE | 102019201635 A1 | 8/2020 |
| EP | 3688885 A1 | 8/2020 |
| EP | 3586212 B1 | 9/2021 |
| EP | 3885872 A1 | 9/2021 |
| EP | 3493168 B1 | 4/2022 |
| JP | 2018103638 A | 7/2018 |
| KR | 100324581 B1 | 2/2002 |
| KR | 101119175 B1 | 3/2012 |
| KR | 20130088506 A | 8/2013 |
| KR | 101698070 B1 | 2/2017 |
| KR | 20170111921 A | 10/2017 |
| KR | 102287852 B1 | 8/2021 |
| KR | 102419355 B1 | 7/2022 |
| WO | 2015073687 A1 | 5/2015 |
| WO | 2016210432 A1 | 12/2016 |
| WO | 2018049257 A1 | 3/2018 |
| WO | 2018089859 A1 | 5/2018 |
| WO | 2020082349 A1 | 4/2020 |
| WO | 2020113062 A1 | 6/2020 |
| WO | 2020220234 A1 | 11/2020 |
| WO | 2021032956 A1 | 2/2021 |
| WO | 2021244544 A1 | 12/2021 |
| WO | 2022000195 A1 | 1/2022 |

* cited by examiner

ANTENNA MEASUREMENT USING UNMANNED AERIAL VEHICLES

BACKGROUND

In electronics and telecommunications, a radio transmitter is an electronic device that emits radio waves with an antenna. The transmitter itself generates a radio frequency alternating current, which is applied to the antenna. When excited by this alternating current, the antenna radiates radio waves.

Transmitters are necessary component parts of all electronic devices that communicate by radio, such as radio and television broadcasting stations, cell phones, walkie-talkies, wireless computer networks, Bluetooth enabled devices, garage door openers, two-way radios in aircraft, ships, spacecraft, radar sets and navigational beacons. The term transmitter is often applied to equipment that generates radio waves for communication purposes or radiolocation, such as radar and navigational transmitters.

A transmitter can be a separate piece of electronic equipment, or an electrical circuit within another electronic device. A transmitter and a receiver combined in one unit is called a transceiver. The purpose of most transmitters is radio communication of information over a distance. The information is provided to the transmitter in the form of an electronic signal, such as an audio signal from a microphone, a video signal from a video camera, or in wireless networking devices, a digital signal from a computer. The transmitter combines the information signal to be carried with the radio frequency signal which generates the radio waves, which is called the carrier signal. This process is called modulation. The radio signal from the transmitter is applied to the antenna, which radiates the energy as radio waves.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Radio transmitters in cellular systems must meet specific power level and spectral emission requirements, such as according to defined standards for interoperability and regulatory limits for compliance. Antennas are designed to produce radiation patterns which should be tested and verified. For instance, antennas can apply beamforming, which combines elements in an antenna array to produce constructive and destructive interference such that the emitted signal is focused in a particular direction.

Radio transmitters are typically tested in a laboratory environment. To measure antenna radiation, the transmitting antenna is placed inside a suitable measurement chamber, and a probe is moved to different positions within the chamber to perform measurements. The measurement probe often has limited mobility, which is unwieldy when measurements are needed at multiple positions, such as to verify a signal's spatial pattern. This problem is further heightened when the emitted signal changes over time, such as when performing power ramping or frequency sweeping.

Furthermore, measurements are limited by the size of the available chamber, which are generally too small for higher power antennas with larger ranges. For example, an active antenna system (AAS) generally integrates passive antennas with active components such as transceivers, amplifiers, or baseband units. An AAS can implement beamforming to produce high-gain beams with a much larger range than the typical test chamber. It is advantageous to test an AAS unit at such larger ranges in order to optimize network performance over as large an area as possible.

The disclosed technology addresses these issues by deploying multiple unmanned aerial vehicles ("UAVs") in the environment around the antenna under test. A UAV, also known as a "drone," is an aircraft without any human pilot, crew, or passengers on board. UAVs are a component of an unmanned aircraft system (UAS), which includes adding a ground-based controller and a system of communications with the UAV. The flight of UAVs may operate under remote control by a human operator, as remotely-piloted aircraft (RPA), or with various degrees of autonomy, such as autopilot assistance, up to fully autonomous aircraft that have no provision for human intervention.

A fleet of UAVs is deployed at multiple positions in the environment surrounding an antenna, such as an antenna of a base station of a telecommunications network. The UAVs can then measure various properties of the signal emitted by the antenna, including total radiated power, effective radiated power, adjacent channel power levels, and out-of-band emissions. In concert, the measurements can be used to generate a dynamic three-dimensional map of the antenna's emitted radiation over time.

In some implementations, one UAV serves as a focal point that is communicatively coupled with the antenna under test as well as the other UAVs. This control UAV provides a channel to exchange data between the antenna's controller and the fleet of UAVs. For example, the control UAV can transmit measurement data to the antenna. The antenna can then adjust transmission or reception parameters based on the measurement data, to improve desired coverage of the antenna. The measurement data can also be used to adjust the positions of the drones, such as to provide additional measurements on a particular area or to obtain a more complete picture of the emitted signal.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
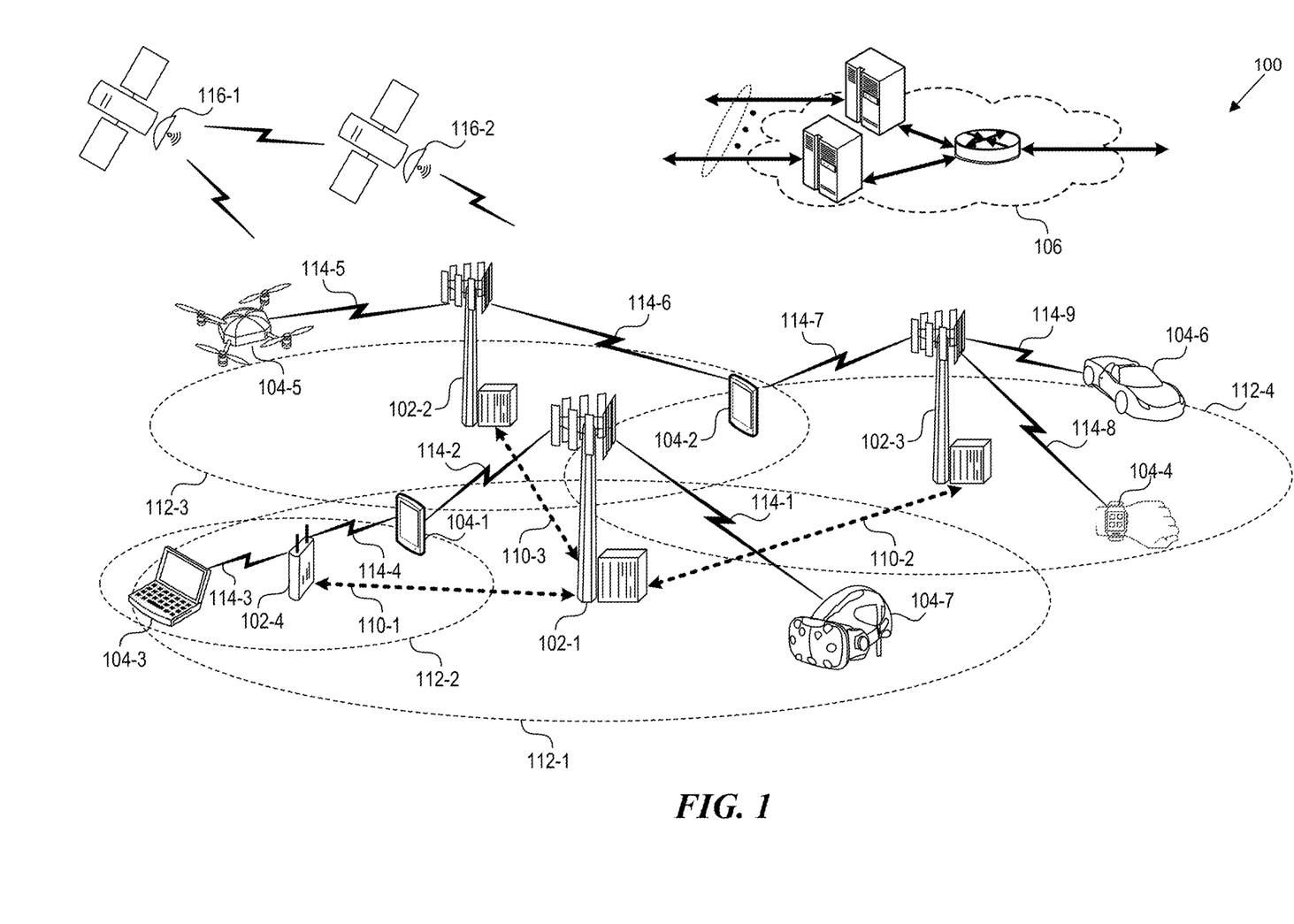
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

UAV System for Testing a Radio Transmitter

Figure 2:
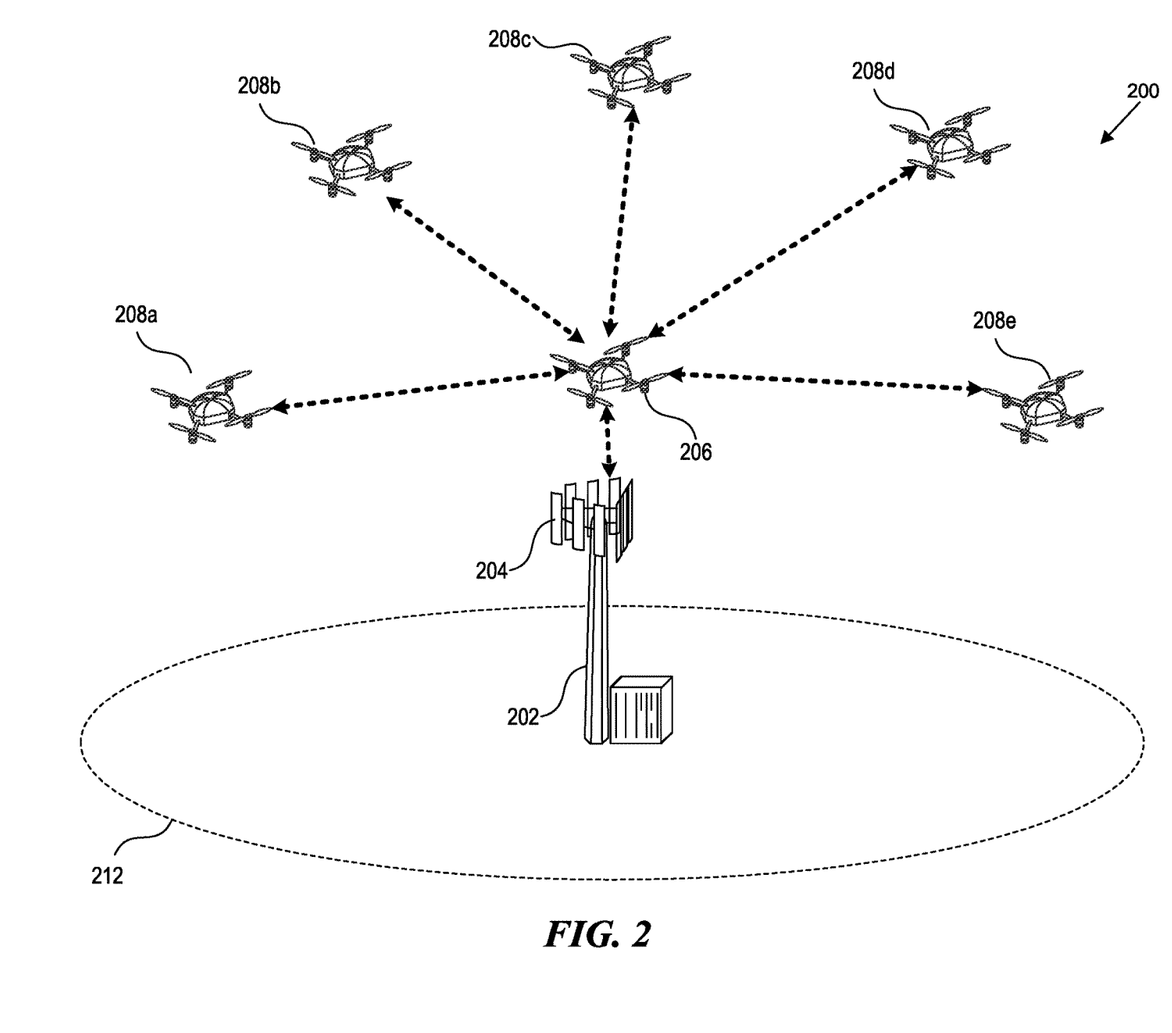
FIG. 2 illustrates a system for testing a radio transmitter of a telecommunications network.

FIG. 2 illustrates a system 200 for testing a radio transmitter of a telecommunications network. A base station 202 includes an antenna 204 that can use antenna beamforming to communicate uplink and downlink signals in a wireless communication channel to mobile devices in a coverage area 212. The antenna 204 can be an active antenna system (AAS) that includes integrated active components in addition to a passive antenna. Example active components include amplifiers, baseband units, etc.

The system 200 includes multiple UAVs 206 and 208*a-e* surrounding a base station 202. The UAVs 206 and 208*a-e* can be similar to the drone 104-5 depicted in FIG. 1. The UAVs 208*a-e*, and optionally the UAV 206, are equipped with radio measurement equipment, such as a spectrum analyzer, a power meter, etc., that are configured to measure properties of the signal emitted by the antenna 204. For example, the UAVs 208*a-e* can be configured to measure total radiated power or effective radiated power. The UAVs can measure the signal across a range of frequencies, such as at a main channel of the antenna 204 or adjacent channels. In some embodiments, the UAVs 208*a-e* are configured to measure out-of-band emissions, such as signals emitted by a different antenna than the antenna 204. In addition, the UAVs 208*a-e* can measure their own position, e.g., by GPS. Thus, the system 200 can measure the signal emitted by the antenna 204 at multiple positions simultaneously without needing to move a cumbersome measurement probe. The system 200 is also able to measure or test the antenna 204 in the entire coverage area 212 rather than being limited to a measurement chamber. In addition, although FIG. 2 shows the antenna 204 is a component of a base station 202 of a telecommunications network, the present technology can be applied to radio transmitters generally, provided sufficient power.

The system 200 can be implemented at the base station 202's installation site, enabling measurements in real-world testing conditions. To that end, the system 200 can measure properties of signals that are emitted during normal operation (e.g., as part of a consumer telecommunications network) as well as signals that are produced specifically for testing purposes, such as frequency sweeps, power ramping, etc. Also, by deploying the drones 208*a-e* on-site, the need to perform a tower climb to remove the antenna 204 from the base station 202 to diagnose and test for issues is reduced. In some implementations, the UAVs 208*a-e* are equipped with temperature, humidity, or pressure sensors. Measuring environmental factors such as temperature, humidity, and pressure can be used to characterize the measurements of the signals or diagnose issues with the antenna 204, as such factors can affect signal propagation. In some implementations, measurements of these environmental factors can be transmitted from the UAVs 208*a-e* to the base station 202, which then adjusts its transmission parameters to account for the measurements.

The UAVs 208*a-e* can be deployed in a variety of spatial configurations or patterns. For example, the UAVs 208*a-e* can be deployed at any distance, polar angle, or azimuthal angle relative to the antenna 204. In some flight patterns, the UAVs 208*a-e* are approximately equidistant from each other. The UAVs 208*a-e* can also be deployed based on the antenna 204's expected radiation pattern, such as deploying a greater density of UAVs 208a-e along an expected beam direction. In addition, the UAVs 208a-e can perform measurements in fixed positions, at multiple positions, or while moving. For example, the positions of the UAVs 208a-e can be set according to a predetermined pattern. The UAVs 208a-e can be deployed by transmitting flight information to each individual UAV 208a-e from a control unit, such as the control UAV 206 or the base station 202. Even though FIG. 2 shows five UAVs 208a-e, fewer or greater numbers of UAVs can be used. Measurements from the multiple UAVs 208a-e can be used to generate a dynamic three-dimensional map of the antenna's emitted radiation over time (e.g., power, frequency distribution, etc.)

In some implementations, at least one of the UAVs is a control UAV 206 that is communicatively coupled to the base station 202 and the remaining UAVs 208a-e. The control UAV 206 is configured to facilitate data transfer between the base station 202 and the other UAVs 208a-e. Such data can include control messages transmitted from the base station 202 to the UAVs 208a-e through the control UAV 206, such as instructions to change position or to adjust measurement parameters. For example, it may be desired to successively test different configurations of the antenna 204 and accordingly change the positions of the UAVs 208a-e. In the other direction, data transmitted from the UAVs 208a-e to the base station 202 can include measurement results or status information of the UAVs 208a-e, such as equipment error messages, battery life, etc.

By facilitating data transfer with the control UAV 206, the UAVs 208a-e does not need to communicate with the base station directly, reducing the number of devices that the base station 202 needs to handle. In addition, the control UAV 206 can physically travel in the environment when receiving data from the other UAVs 208a-e, which extends the range that the system 200 can measure. In some implementations, the control UAV 206 is similarly equipped to the other UAVs 208a-e and performs measurements of the signal emitted by the antenna 204. In some implementations, the system 200 does not include a control UAV 206, and the UAVs 208a-e communicate with the base station 202 directly or with an intermediate ground-based unit.

Data from the UAVs 208a-e are transmitted to the base station 202 or transmitted through the base station 202 to another ground-based computing resource for analysis, and feedback can be provided to the UAVs 208a-e based on the analysis. Thus, data transmission between the UAVs 208a-e and the base station 202 enables the system 200 to be adjusted in real-time based on the measurements collected by the UAVs 208a-e. As discussed above, the base station 202 can adjust a reception or transmission parameter, such as gain or beam direction, in response to measurement results from the UAVs 208a-e. In addition, the base station 202 can transmit flight information to the UAVs 208a-e, either through the control UAV 206 or directly, in response to receiving and analyzing the measurements. For example, the base station 202 can instruct the UAVs 208a-e to perform additional measurements or increase density of measurements in a region of interest (e.g., in response to an anomalous measurement). In another example, the base station 202 can receive an indication that a UAV 208 at a particular location is not available and instruct another UAV to perform a measurement at the location.

The base station 202 can also adjust an uplink or reception parameter based on communications between the base station 202 and the control UAV 206 or the UAVs 208a-e. For example, the control UAV 206 or a UAV 208a-e can transmit a calibrated signal to the base station 202. The power or spectrum of the signals received at the base station 202 can be compared to an initial calibration of the signal as transmitted by the UAVs 206 or 208a-e. The base station 202 can then adjust a receiver setting based on the calibrated signal, such as receiver gain or a signal processing setting. The receiver of the base station 202 can include multiple antenna elements, which can be adjusted individually or collectively.

In some implementations, the base station 202 receives multiple test signals from one or more of the UAVs 206 and 208a-e. Multiple test signals can be used to test multiple uplink performance of the base station 202, such as processing of multi-user MIMO (MU-MIMO). The UAVs 206 or 208a-e can also transmit signals to the base station 202 to test adjacent cell interference cancellation. For example, a difference between a signal received at the base station 202 and the calibrated test signals transmitted by the UAVs 206 or 208a-e can be used to adjust parameters of an adaptive filter configured to reduce interference. In some implementations, the differences between received and calibrated signals can be used as inputs to a machine learning model. For example, the model can determine the parameters of the adaptive filter, and the resulting performance of the interference cancellation can be used to further train the model. Further detail regarding machine learning implementations is described below.

In some implementations, the radiation emitted by the antenna 204, the positions of the UAVs 208a-e, or measurement parameters can be determined by a machine learning model. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive measurements of the antenna 204's signal as measured by UAVs 208a-e. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as an adjustment to a transmission or reception parameter, measurement parameter, or position of the UAV 208a-e. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes measurements of the antenna 204 as input and a desired output, such as an optimized pattern of the UAVs 208*a-e* or a target position of a single UAV 208*a-e*. A representation of a measurement, including position, can be provided to the model. Output from the model can be compared to the desired output for that measurement or position and, based on the comparison, the model can be modified, such as by changing weights between nodes of the neural network or parameters of the functions used at each node in the neural network (e.g., applying a loss function). After applying each of the measurements of the antenna 204 in the training data and modifying the model in this manner, the model can be trained to evaluate new measurements.

In some implementations, the machine learning model is applied at the base station 202 or at another computing device coupled to the base station 202. Results from the model can then be transmitted to the UAVs 208*a-e* from the base station 202, e.g., through the control UAV 206 or directly. In some implementations, each of the UAVs 208*a-e* executes a local instance of the model.

For example, a machine learning model can be trained to optimize an individual UAV 208's location, orientation, or sensor parameters based on measurement results at that UAV 208. This model can be trained as described above by a training data set that includes signal measurements, such as power, noise, frequency, etc., to identify a relationship (e.g., a regression model) with properties of the UAV 208, such as location, orientation, or sensor parameters. After training the model, the UAV 208 can implement the model to automatically adjust its position, orientation, or sensors during field testing to produce measurements with higher quality. For instance, by implementing the machine learning model, the UAV can measure the signal from the antenna 204 with improved accuracy and less noise. In some implementations, these results can be fed back into the machine learning model to further refine the model. In some implementations, the machine learning model can incorporate other variables, such as temperature, pressure, humidity, or other environmental information.

Figure 3:
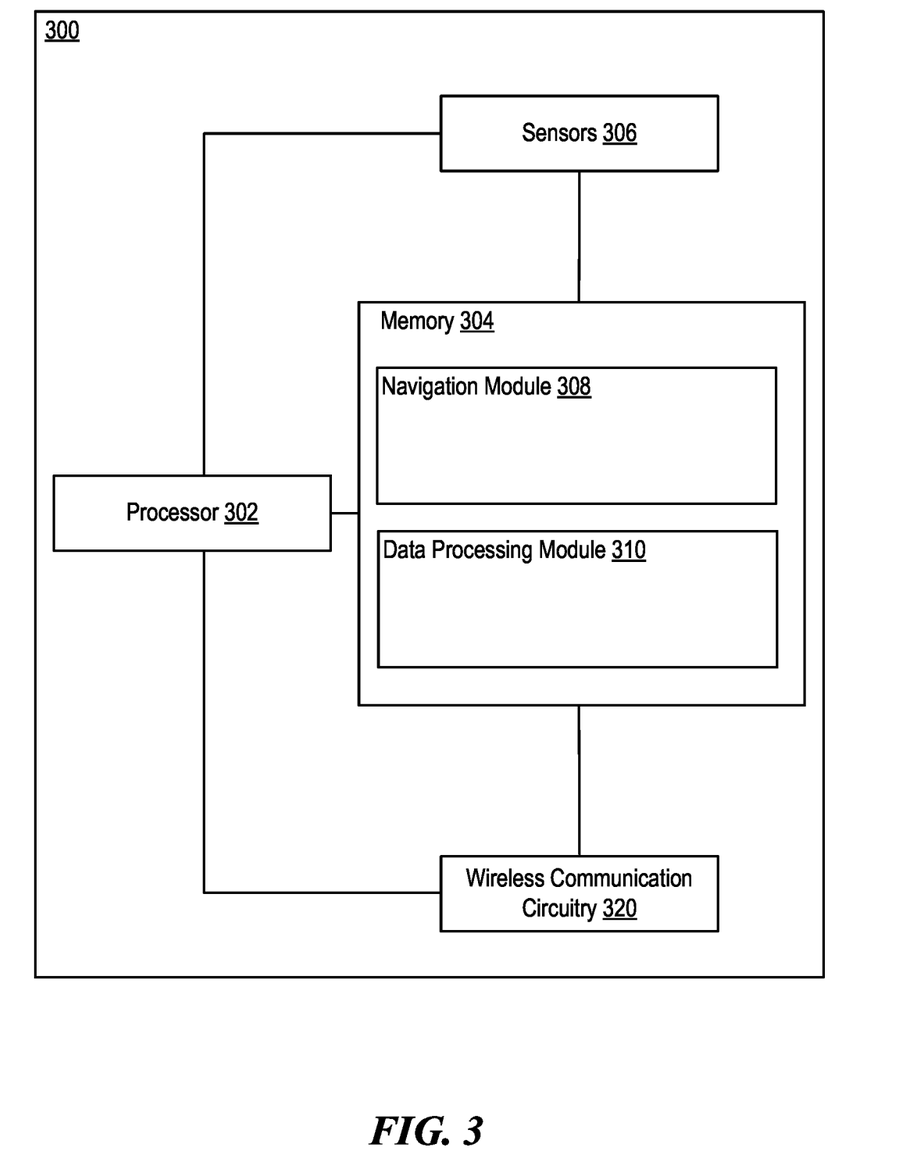
FIG. 3 is a block diagram that illustrates components of an unmanned aerial vehicle (UAV).

FIG. 3 is a block diagram that illustrates components of a UAV 300. The components shown in FIG. 3 are merely illustrative and well-known components are omitted for brevity. As shown, the UAV 300 includes a processor 302, a memory 304, and a sensor 306. The UAV 300 can be similar to the drone 104-5 of FIG. 1 or the UAV 206 or 208*a-e* of FIG. 2. The UAV 300 includes wireless communication circuitry 320 designed to establish wireless communication channels with other computing devices, such as another UAV or a base station. The processor 302 can have generic characteristics similar to general-purpose processors, or the processor 302 may be an application-specific integrated circuit (ASIC) that provides arithmetic and control functions to the UAV 300. While not shown, the processor 302 may include a dedicated cache memory. The processor 302 can be coupled to all components of the UAV 300, either directly or indirectly, for data communication.

The memory 304 may be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 302, the memory 304 can also store data generated by the processor 302 (e.g., when executing the modules of an optimization platform). The memory 304 is merely an abstract representation of a storage environment. Hence, in some embodiments, the memory 304 is comprised of one or more actual memory chips or modules.

An example of the sensors 306 include a spectrum analyzer, power meter, or other sensors used to measure properties of radio frequency waves. An example of the wireless communication circuitry 320 forms and/or communicate with a network for data transmission among computing devices, such as personal computers, mobile phones, and computer servers. The wireless communication circuitry 320 can be used for communicating with other UAVs 300, with a base station (e.g., base station 202 of FIG. 2), or for connecting to a higher-level network (e.g., a LAN) or the Internet. In some implementations, the wireless communication circuitry 320 can be implemented in a radio frequency ("RF") transceiver of the UAV 300. In some implementations, the sensors 306 can also include one or more of the following: a microphone, a camera, a thermostat, an accelerometer, light sensors, motion sensors, moisture sensors, chemical sensors, pressure sensors, LIDAR, RADAR, and the like. One or more of these sensors, for example, may be used as part of a navigation module 308.

For convenience, a navigation module 308 and a data processing module 310 may be referred to as computer programs that reside within the memory 304. The term "module" refers broadly to software components, firmware components, and/or hardware components. Accordingly, the modules 308 and 310 could be comprised of software, firmware, and/or hardware components implemented in, or accessible to, the UAV 300.

The navigation module 308 can navigate the UAV 300 according to flight information received by the wireless communication circuitry 320. For instance, the UAV 300 can receive flight information from a control unit, such as the control UAV 206 or the base station 202 of FIG. 2. The navigation module 308 can also receive inputs from the sensors 306 and navigate accordingly, for example to avoid collisions. The navigation module 308 can actuate the UAV 300's propulsion system, such as motors, engines, propellers, etc. The navigation module 308 can determine the UAV 300's position, such as using an on-board GPS.

The data processing module 310 includes software configured to process measurement results obtained by the sensors 306, including measurements of a radio transmitter under test, such as the antenna 204 of FIG. 2. For example, the data-processing sub-module 312 can package the raw data generated by the sensors 306 for transmission by the wireless communication circuitry 320. The data processed by the sub-module 312 can include various properties of an RF signal, such as power, frequency, phase, etc. The data processing sub-module can also process location, temperature, or other measurements produced by the sensors 306, as well as internal diagnostics. The data processing module 310 can also be configured to perform analysis on the measurement results. Outputs of the analysis performed by the data processing module 310 can be used by the navigation module 308, for example to change the UAV 300's flight pattern. The analysis can also be used to adjust parameters of the sensors 306 or to trigger communications by the wireless communication circuitry 320. In some implementations, the data processing sub-module includes a local instance of a trained machine learning algorithm, as described above with reference to FIG. 2. For example, the data processing module 310 can receive RF measurement information from the sensors 306 to produce an adjusted position or orientation of the UAV 300, which is used by the navigation module 308 to physically change the position or orientation of the UAV 300.

Figure 4:
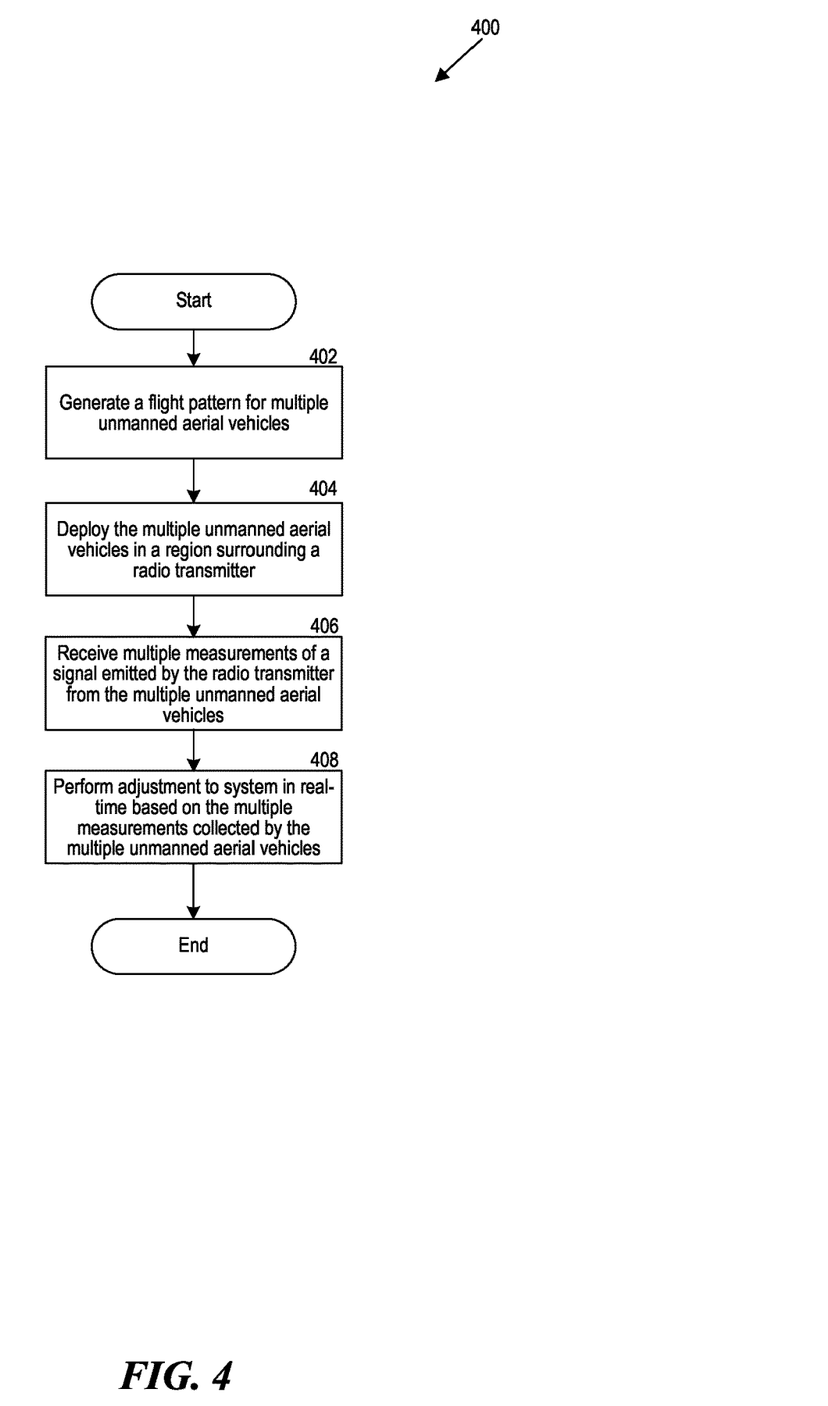
FIG. 4 is a flowchart that illustrates a process for measuring signals emitted by a radio transmitter.

FIG. 4 is a flowchart that illustrates a process performed by a system (e.g., system 200 of FIG. 2) for measuring signals emitted by a radio transmitter. At 402, a flight pattern is generated for multiple unmanned aerial vehicles (UAVs). The multiple unmanned UAVs can be similar to the drone 104-5 of FIG. 1, the UAVs 206 and 208a-e of FIG. 2, or the UAV 300 of FIG. 3.

At 404, multiple UAVs are deployed in a region surrounding a radio transmitter according to the flight pattern from step 402. The multiple unmanned aerial vehicles are equipped with a sensor configured to measure a radio signal emitted by the radio transmitter. For example, the radio transmitter can be similar to the antenna 204 of FIG. 2. The radio signal can be a signal emitted by the antenna 204 during normal operation or can be a signal produced specifically for testing purposes.

At 406, multiple measurements of the radio signal are received from the multiple UAVs. The multiple measurements can include radiated power, frequency, or other measurements used in RF signal processing. The multiple measurements can be transmitted to a base station or transmitted through the base station to another ground-based computing resource for analysis, and feedback can be provided to the multiple UAVs based on the analysis.

At 408, the system can be adjusted in real-time based on the multiple measurements collected by the multiple UAVs. For example, the base station can adjust transmission parameters, such as gain or beam direction, in response to multiple measurement results from the multiple UAVs. The base station can also adjust a reception parameter, such as gain In addition, the base station can transmit flight information to the multiple UAVs, either through a control UAV or directly, in response to receiving and analyzing the multiple measurements. For example, the base station can instruct the multiple UAVs to perform additional measurements or increase density of measurements in a region of interest (e.g., in response to an anomalous measurement). In another example, the base station can receive an indication that a UAV at a particular location is not available and instruct another UAV to perform a measurement at the location. In some implementations, the radiation emitted by an antenna, the positions of the UAVs, or measurement parameters can be determined by a machine learning model.

Computer System

Figure 5:
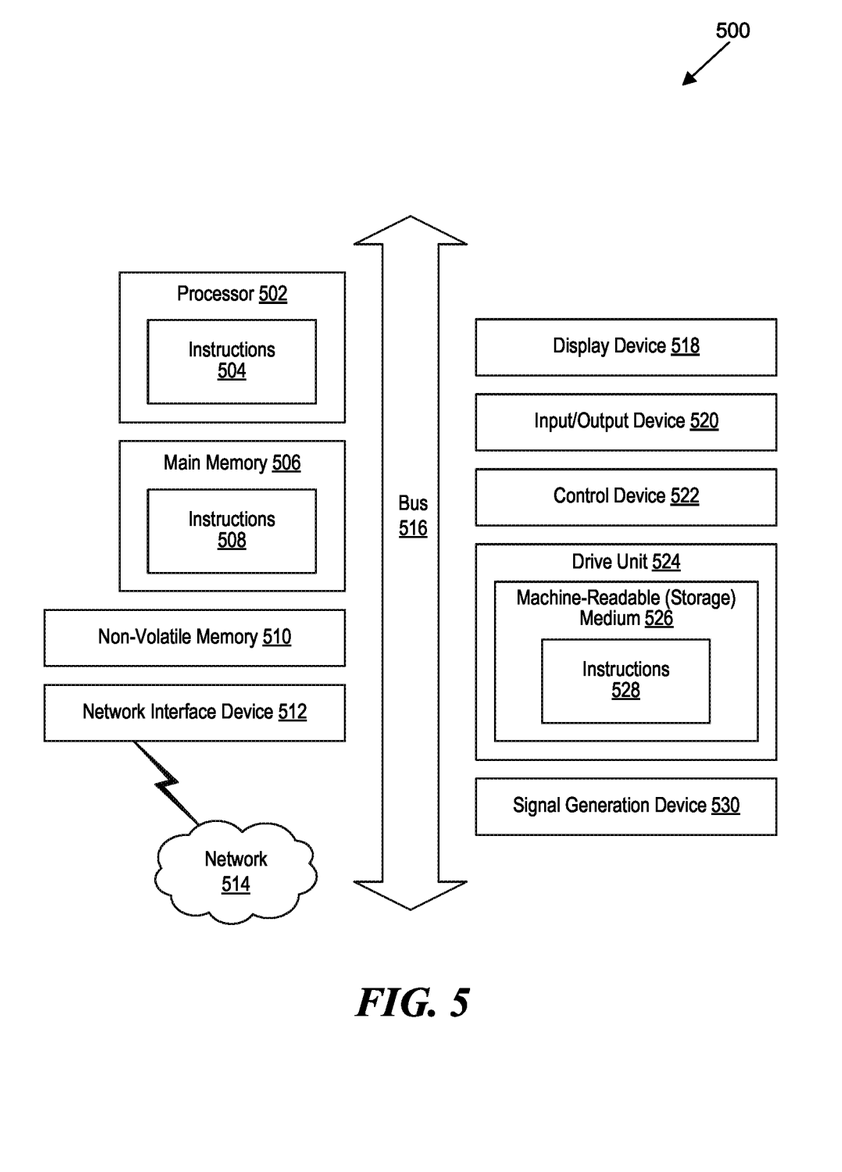
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed:
1. A system for testing an antenna of a base station of a telecommunications network, the system comprising:
multiple unmanned aerial vehicles (UAVs) equipped with:
a receiver configured to receive wireless signals emitted by the antenna, and
a spectrum analyzer configured to measure the received wireless signals; and
a control unit,
wherein the control unit is a control UAV of the multiple UAVs, and
wherein the control unit is mobile, thereby providing an extended range for testing the antenna, the control unit including:
a transceiver;
at least one hardware processor; and
at least one non-transitory memory storing instructions, which when executed, cause the control unit to:
receive a measurement result from the multiple UAVs,
wherein the measurement result reflects the wireless signals measured simultaneously by the multiple UAVs at multiple fixed positions, and
wherein the measurement result is provided to the base station to generate a three-dimensional map of energy output of the antenna over a predetermined time period, transmit a message to the base station to modify transmission or reception parameters of the wireless signals emitted by the antenna based on the measurement result,
wherein the modification is based on the three-dimensional map of the wireless signals emitted by the antenna, and
transmit flight information to the multiple UAVs configured to cause the multiple UAVs to measure the modified wireless signals emitted by the antenna at positions indicated by the flight information,
wherein the flight information is generated based on the measurement result and causes the multiple UAVs to change position from prior positions to the positions indicated by the flight information.

2. The system of claim 1, wherein the positions indicated by the flight information correspond to a predetermined pattern and wherein the positions are approximately equidistant from each other.

3. The system of claim 1, wherein the control unit is the base station.

4. The system of claim 1, wherein the control unit is communicatively coupled to the base station, and wherein executing the instructions further causes the transceiver to:
transmit a calibrated signal to the base station; and
cause the base station to adjust a setting of a receiver of the base station based on the calibrated signal.

5. The system of claim 1, wherein multiple drones are further equipped with at least one of: a temperature sensor, a humidity sensor, or a pressure sensor, and wherein the measure of the wireless signals is characterized based on a measurement performed by the temperature sensor, the humidity sensor, or the pressure sensor.

6. The system of claim 1, wherein the antenna is configured to transmit the wireless signals in a main channel, and wherein the spectrum analyzer is configured to measure:
a first received power of the main channel,
a second received power of an adjacent channel to the main channel, and
a third received power outside the main channel and the adjacent channel.

7. The system of claim 1, wherein the instructions further cause the control unit to:
cause each of the multiple UAVs to transmit test signals to be concurrently received by the antenna in order to test a multiple uplink capability of the base station.

8. A computer-readable storage medium, excluding transitory signals and carrying instructions, which, when executed by at least one data processor of a system, cause the system to:
generate a flight pattern for multiple unmanned aerial vehicles (UAVs),
wherein the multiple UAVs include a control UAV, and wherein the control UAV is communicatively coupled to the system and the remaining UAVs of the multiple UAVs;
facilitate deployment of the multiple UAVs in a region surrounding a radio transmitter according to the flight pattern,
wherein the multiple UAVs are equipped with a sensor configured to measure a radio signal emitted by the radio transmitter, and
wherein the control UAV is mobile, thereby providing an extended range for measuring the radio signal;
receive a measurement result of the radio signal from the multiple UAVs,
wherein the measurement result from the multiple UAVs are relayed through the control UAV to the system,
wherein the measurement result reflects the radio signal measured simultaneously by the multiple UAVs at multiple fixed positions, and
wherein the measurement result is provided to the system to generate a three-dimensional map of energy output of the radio transmitter over a predetermined time period; and
transmit a message to the radio transmitter to modify transmission or reception parameters of the signal emitted by the radio transmitter based on the measurement result.

9. The computer-readable storage medium of claim 8, wherein the flight pattern indicates positions of the multiple UAVs and wherein the positions are approximately equidistant from each other.

10. The computer-readable storage medium of claim 8, wherein the flight pattern is generated using a machine learning model configured to produce an optimized flight pattern using parameters of the radio transmitter as inputs.

11. An unmanned aerial vehicle (UAV) comprising:
a receiver;
a sensor configured to measure a radio signal emitted by a radio transmitter;
at least one hardware processor; and
at least one non-transitory memory storing instructions, which, when executed by the at least one hardware processor, causes the UAV to:
receive, by the receiver, a flight pattern;
position the UAV in a fixed region proximate to the radio transmitter according to the flight pattern; and
produce, by the sensor, a measurement of the radio signal;
transmit a measurement result to a control unit to be transmitted to a base station to generate a three-dimensional map of energy output of the radio transmitter over a predetermined time period,
wherein the control unit is a control UAV communicatively coupled to a base station and to multiple other UAVs,
wherein the control UAV is mobile, thereby providing an extended range for testing, and
wherein the control UAV is configured to relay instructions from the base station to the multiple other UAVs; and
detect a modified radio signal emitted by the radio transmitter in response to the measurement result being transmitted to the control unit,
wherein the modified radio signal is based on transmission parameters modified based on the three-dimensional map of the radio signals emitted by the radio transmitter.

12. The UAV of claim 11, wherein the measurement includes a first received power of a main channel of the radio transmitter and a second received power of an adjacent channel to the main channel, and wherein the UAV is further caused to measure a third received power of a second radio transmitter outside the main channel and the adjacent channel.

13. The UAV of claim 11, wherein the UAV is configured to adjust its position according to a machine learning model that is configured to produce an adjusted position using the measurement of the radio signal as an input, and wherein the machine learning model is trained using a training data set that includes target positions and associated radio signal measurement values.

14. The UAV of claim 11 further caused to:
transmit the measurement of the radio signal to a control unit;
receive an adjusted flight pattern that is generated based on the measurement of the radio signal; and
reposition the UAV according to the adjusted flight pattern.

* * * * *